United States Patent [19]

Watanabe

[11] Patent Number: 5,529,855

[45] Date of Patent: *Jun. 25, 1996

[54] STRUCTURE FOR WETTING DIAPHRAGM OF SOLID POLYMER ELECTOLYTE ELECTROCHEMICAL CELL AND PROCESS OF PREPARING SAME

[75] Inventor: Masahiro Watanabe, No. 2412-8, Wadamachi, Kofu-shi, Yamanashi, Japan

[73] Assignees: Tanaka Kikinzoku Kogyo K.K.; Masahiro Watanabe, both of Japan

[ * ] Notice: The term of this patent shall not extend beyond the expiration date of Pat. No. 5,262,250.

[21] Appl. No.: 173,420

[22] Filed: Dec. 23, 1993

[51] Int. Cl.[6] .............................. H01M 8/10; H01M 8/02
[52] U.S. Cl. ................. 429/34; 429/30; 429/33; 429/72
[58] Field of Search ................. 429/30, 33, 38, 429/34, 72

[56] References Cited

U.S. PATENT DOCUMENTS

| | | | |
|---|---|---|---|
| 4,729,932 | 3/1988 | McElroy | 429/34 |
| 4,824,741 | 4/1989 | Kunz | 429/34 |
| 5,262,250 | 11/1993 | Watanabe | 429/33 |
| 5,322,744 | 6/1994 | Koseki | 429/34 |

*Primary Examiner*—Prince Willis, Jr.
*Assistant Examiner*—Carol Chaney
*Attorney, Agent, or Firm*—Klauber & Jackson

[57] ABSTRACT

Disclosed is a structure for wetting a diaphragm of a solid polymer electrolyte fuel cell in which one or more hollow paths are provided in or on the diaphragm for supplying water to the solid polymer electrolyte.

According to the structure of this invention, the elevation of performances of the above cell is achieved by wetting the diaphragm at a desired level. Since the water can be supplied through the hollow paths with substantially no resistance, the amount to be supplied can be freely controlled.

4 Claims, 1 Drawing Sheet

STRUCTURE FOR WETTING DIAPHRAGM OF SOLID POLYMER ELECTOLYTE ELECTROCHEMICAL CELL AND PROCESS OF PREPARING SAME

BACKGROUND OF THE INVENTION

The present invention relates to structure for wetting a diaphragm of an electrochemical cell employing a solid polymer electrolyte (hereinafter referred to as "PE") for attaining a high performance, and a process of preparing same.

Especially a fuel cell among electrochemical cells employing PE has been developed as an anti-pollution electric power generator having high energy efficiency in view of the problems of exhaustion of energy resources and global environmental pollution.

A fuel cell employing PE is expected to be a lightweight and high power generator which may be useful as a small-size electric source for an electric automobile or the like (disclosed in reference 1; D. Watkins et al., Proceeding of the 33rd International Power Sources Symposium, PP. 782 to 791, 13 to 16, Jun. (1988), and in reference 2; E. A. Ticianelli et al., J. Electrochemical Society, 135, 2209, (1988)).

Other electrochemical cells using PE are expected to be employed in electro-synthesis starting from water, methanol, such a hydrocarbon as ethylene and the like in the future.

The performance of these cells is largely influenced by the ionic conductivity of the PE employed.

When a sufficient amount of water is not contained in a PE, its conductivity considerably decreases with the increase of its resistance to lower the cell performances.

In order to overcome the said drawback, a reaction gas (a hydrogen gas as fuel and oxygen or air as oxidant) containing water vapor may be introduced into a cell.

Since, in this improved cell, the partial pressure of the reaction gas decreases due to dilution with the water vapor by the partial pressure of the water vapor, and the diffusion of the reaction gas in the reaction layer of an electrode is also reduced, the characteristics of the cell may be deteriorated.

Since the water pressure which changes with a changing load cannot be sufficiently controlled, the PE is dried or the catalyst layer is inversely overwetted resulting in the deterioration of the cell performance.

A larger amount of $H_2O$ is exhausted in an anode side because several molecules of $H_2O$ are accompanied with an $H^-$ ion permeating through the PE from the anode to the cathode of which the amount is proportional to the current. However, it is difficult to overcome this disadvantage by the said water vapor mixing process (disclosed in reference 3; T. Springr et al., Extended Abstract No. 118, J. Electrochemical Society Meeting, vol. 190-2, Oct. (1990)).

Accordingly, these problems shall be absolutely overcome for employing the fuel cell as a moving electric source of which a load largely changes, and the same problems exist in an electrolytic cell using a PE.

While water is directly supplied to the rear of an anode and electrolyzed in conventional water electrolysis, an extra operation of separating the oxygen gas evolved and the unreacted water outside of the cell is required.

In order to overcome these drawbacks, the present inventor has proposed an improved structure of wetting a diaphragm in my prior application (U.S. Ser. No. 07/835,222).

The application has provided the structure of PE in which a plurality of yarns made of, for example, anti-corrosive polytetrafluoroethylene for supplying water through the yarns are formed. Although, however, this structure is effective for elevating the cell performances, the supply rate is sometimes insufficient to achieve the desired cell performances because the water or water vapor proceeds while passing through the yarns.

SUMMARY OF THE INVENTION

An object of the present invention is to provide means for wetting a diaphragm of the solid polymer electrolyte electrochemical cell for overcoming the problems already mentioned for realizing the electrochemical cell with desired performances, and a process of preparing the structure.

Another object is to provide an electrochemical cell having a structure for improved cell performances by wetting a PE with water supplied through one or more narrow hallow paths.

One aspect of the present invention is a means for wetting diaphragm of solid polymer electrolyte fuel cell in which one or more hollow paths are provided in or on the diaphragm for supplying water to the solid polymer electrolyte.

Another aspect is a process of preparing a structure for wetting a diaphragm of a solid polymer electrolyte fuel cell which comprises providing one or more water-soluble yarns on or in the solid polymer electrolyte, shaping the solid polymer electrolyte and removing the yarns by dissolution thereof to form one or more hollow supply paths for water.

A considerable lowering of the value of the diaphragm resistance can be realized by employing a diaphragm structure wetted in accordance with the present invention so that, consequently, an increase of the cell voltage is obtained compared with the conventional electrochemical cell structure.

Even if the present invention is compared with my earlier invention mentioned in the above prior application, the cell performances can be easily increased because a sufficient amount of the water is supplied to the diaphragm or the solid polymer electrolyte through the hollow paths. Since, further, the flow resistance of the water in the hollow paths is quite small, the supply amount of the water may be smoothly controlled by means, for example, a pump, to a desired level that cannot be attained in my earlier invention because of the large resistance in the path embedded with the anti-corrosive yarns.

The hollow paths in or on the surface of the diaphragm can be readily formed in accordance with the process of the invention, that is, the dissolution of the water-soluble yarns which has already been formed in the desired pattern in or on the diaphragm.

DETAILED DESCRIPTION OF THE INVENTION

The present invention will be hereinafter described in detail.

The above-mentioned problems of the conventional electrochemical cell can be easily overcome by employing a PE as a diaphragm and changing the amount of water according to operational conditions (current density, temperature and the like) to be supplied in one direction through a narrow path formed in or on the diaphragm.

In the present invention, the flow rate may be changed more easily than in my earlier invention because the resistance in the hollow path is quite small.

The diaphragm employing a PE may be prepared in a laboratory by arranging water-soluble yarns, for example, twisted yarns of polyvinyl alcohol, on a PE such as Nafion (trademark) membrane (diaphragm) at such a desired interval as 1 mm, hotpressing the membrane, then placing another Nafion membrane on the above Nafion membrane having the arranged twisted yarns, hotpressing the interposed membranes and removing the twisted yarns by dissolution in hot water. Industrially, the water-soluble yarn may be embedded in the membrane at the time of the manufacture thereof. For strengthening the membrane, other yarns perpendicular to the above yarns may be formed, or woven or unwoven cloths may be added to the membrane.

Figure 1:
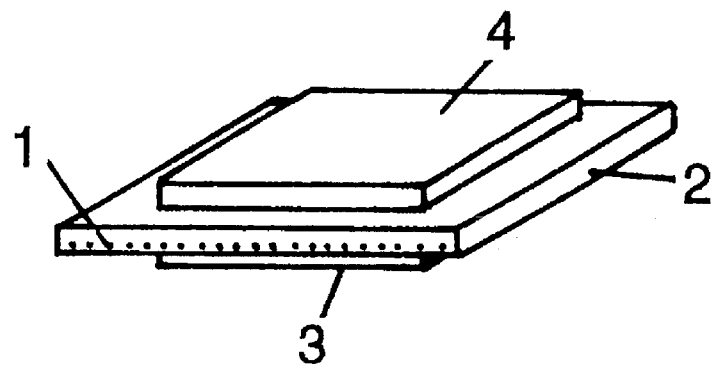
FIG. 1 is a perspective view showing an anode and a cathode including a PE diaphragm joined therebetween having narrow and hollow paths for supplying water.

In FIG. 1, the thus prepared PE diaphragm 2, having a water supply path 1 is shown with a gas diffusion anode 3 and a gas diffusion cathode 4 joined at the two sides of the diaphragm 2, which electrodes are generally employed in a fuel cell.

Figure 2:
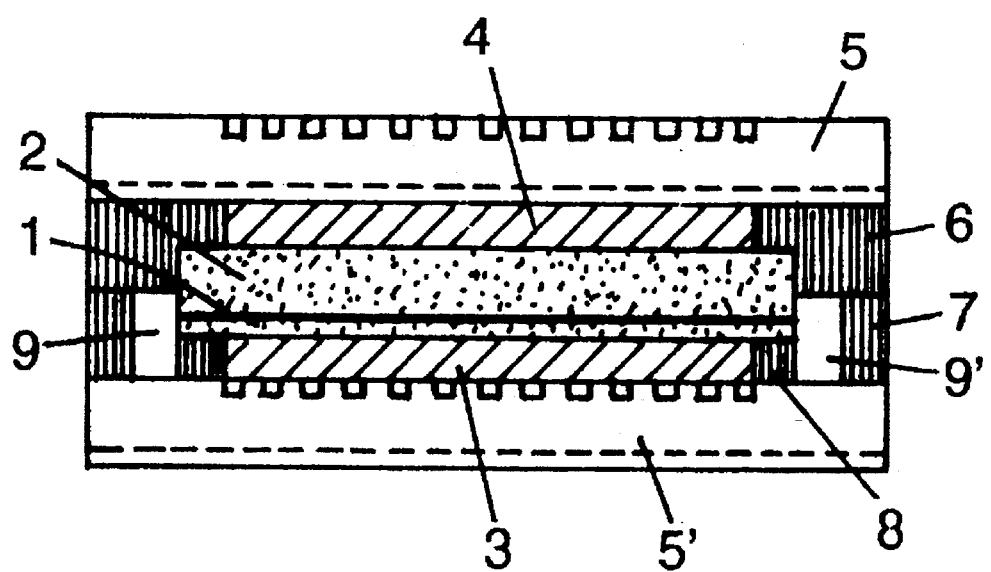
FIG. 2 is a sectional view of a fuel cell employing the PE diaphragm assembled into a single cell having a sealing structure.

The structure of an electrochemical cell employing the diaphragm 2 is as shown in FIG. 2 in which the diaphragm 2 is sealed between a pair of bipolar plates 5,5' for gas supply and separation using packages 6, 7 and 8.

Water supplied from the lower stack through intercellular connecting paths passes from a liquid reservoir (inlet) 9 through the water supply path 1 to the PE diaphragm 2 for wetting it, and the water then passes through the intercellular connecting paths and is discharged from the upper portions.

The desired wetting level of the diaphragm can be promptly obtained by changing the supply pressure of the water in accordance with the a1 operation conditions.

Although Examples of the present invention will be hereinafter described, these Examples do not restrict the present invention.

EXAMPLE 1

On commercially available PE (Du Pont; Nafion 117®) having a thickness of about 0.18 mm and a dimension of 50×50 mm, 48 twisted yarns made of polyvinyl alcohol (having a diameter of about 0.05 mm) were disposed at an interval of 1 mm.

Separately, another Nafion 117 was placed on the polyvinyl alcohol twisted yarns. After the interposed Nafions were hotpressed at 50 kg/cm$^2$ and at 150° C., the thus prepared diaphragm was set in the apparatus shown in FIG. 2 (excluding the anode and the cathode therefrom). Water was supplied from the reservoir 9 and discharged from the reservoir 9' while maintaining a temperature at 90° C. to remove the polyvinyl alcohol twisted yarns by dissolution to form narrow and hallow paths for supplying water. The Nafion was treated with 1-normal sulfuric acid to make its form to a proton type.

Gas diffusion electrodes for an anode and a cathode employed in an ordinary phosphoric acid type fuel cell were prepared by loading 30% in weight of a platinum catalyst on carbon black so as to attain a supporting ratio of 0.5 mg-catalyst/cm$^2$. On the surface of this catalyst layer, Nafion dissolved in solvent was applied and impregnated at the ratio of 4 mg/cm$^2$ according to a method mentioned in the above reference 2.

Thereafter, the PE diaphragm formerly prepared was interposed between the two sheets functioning as an anode and a cathode to prepare a fuel cell employing the PE diaphragm.

EXAMPLE 2

A diaphragm was prepared in accordance with the procedures of Example 1 except that one of the two Nafions was excluded so that the twisted yarns were located on the surface of the Nafion. This diaphragm was boiled in a beaker of water and washed for removing the yarns by dissolution to provide a PE diaphragm having water supply paths on the surface. The diaphragm was treated with 1 normal sulfuric acid to make its form to a proton type. A fuel cell was assembled similarly to the procedures of Example 1, disposing an anode on the water supply path side.

COMPARATIVE EXAMPLE

The fuel cell employing the PE diaphragm was prepared according to the same procedures of Examples 1 and 2 except that the commercially available PE diaphragm mentioned above was employed in place of the diaphragms of Examples 1 and 2.

The respective fuel cells as prepared in the Examples and Comparative Example were incorporated in a single cell test apparatus having a cell structure of FIG. 2, and a reference electrode was installed on the diaphragm of the reservoir (inlet) 9 side. The respective values of the diaphragm resistance of the anode and the cathode were measured and compared under various conditions employing a current interrupter method. The results are shown in Table 1.

Table 1 compares the resistance values per unit area of the PE diaphragms wetted by means of the process of this invention and a conventional vapor wetting method (reaction gases of the anode and cathode were both saturated at 60° C.) when the fuel cells were operated at 60° C.

TABLE 1

| Wetting Process | Wett. Process of Invention | | Vapor Wett. Process Comparative |
|---|---|---|---|
| | Example 1 | Example 2 | Example |
| Resistance (A-C) | 0.296 Ω | 0.149 Ω | 0.226 Ω |
| Resistance (A-R) | 0.197 Ω | 0.098 Ω | 0.173 Ω |
| Resistance (C-R) | 0.099 Ω | 0.050 Ω | 0.054 Ω |

A-C; Resistance Between Anode and Cathode
A-R; Resistance Between Anode and Reference Electrode
C-R; Resistance Between Cathode and Reference Electrode As apparent from the A-C values of Table 1, the diaphragms of Examples 1 and 2 in accordance with the present invention possess completely equivalent specific resistances considering that the thickness of the PE diaphragm of Example 1 is twice that of Example 2. On the other hand, the resistance value of the overall diaphragms according to these Examples decreased to two-thirds of that of the conventional wetting process. As apparent from comparison of A-R, it has been shown that these Examples are accompanied with remarkable effects because drying of, especially, the anode side is reduced to bring about a considerable lowering of the value of the diaphragm resistance. Owing to the reduction of the diaphragm resistance, the elevation of cell voltage of about 38 mV in case of the electricity generation at 500 mA/cm$^2$, and of 76 mV of the electricity generation at 1 A/cm$^2$, was obtained when employing single Nafion 107 membrane as the PE diaphragm. It has been confirmed that the operation employing the PE diaphragms of Examples 1 and 2 can be performed up to a high current density of at least 1 A/cm$^2$ with no increase of the resistance.

Although the PE diaphragm having the narrow paths of which a diameter is about 50 μm is employed for supplying the water in the above Examples, the diaphragm in the present invention is not restricted thereto and the same effects are obtained employing a diaphragm having water supply paths for which the diameter is less than the thickness of the diaphragm. Although the paths are formed at an interval of 1 mm, the present invention is not restricted thereto and the better effects compared to those of the conventional indirect wetting process can be obtained so long as the flow hindrance of a proton induced by the existence of the paths does not exceed the effects of the direct wetting.

What is claimed is:

1. A fuel cell diaphragm comprising a solid polymer electrolyte comprising means for wetting said diaphragm in which one or more hollow paths are provided in or on said diaphragm for supplying water to said solid polymer electrolyte.

2. The fuel cell diaphragm as claimed in claim 1, wherein one or more hollow paths are formed by removing one or more water=soluble yarns which are placed on or in the diaphragm.

3. The fuel cell diaphragm as claimed in claim 1, wherein the hollow paths are used for supplying water consumed on an anode or a cathode.

4. The fuel cell diaphragm as claimed in claim 1, wherein the supply rate of the water to the hollow paths is controlled by a pump.

* * * * *